Sept. 17, 1968 J. L. SCOTT 3,401,714
VALVE STRUCTURES FOR INFLATABLE ARTICLES
Filed Aug. 26, 1965
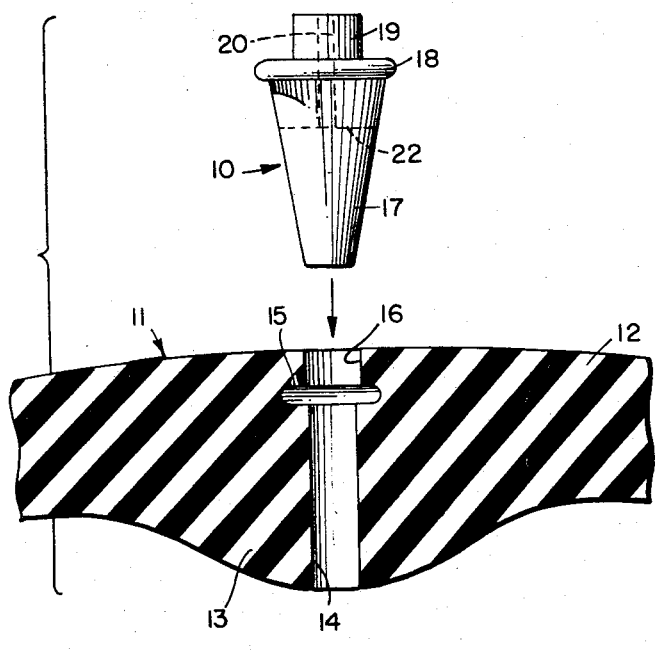
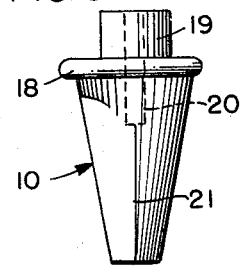
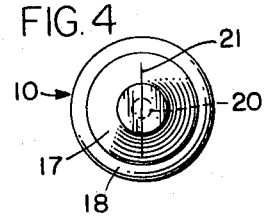
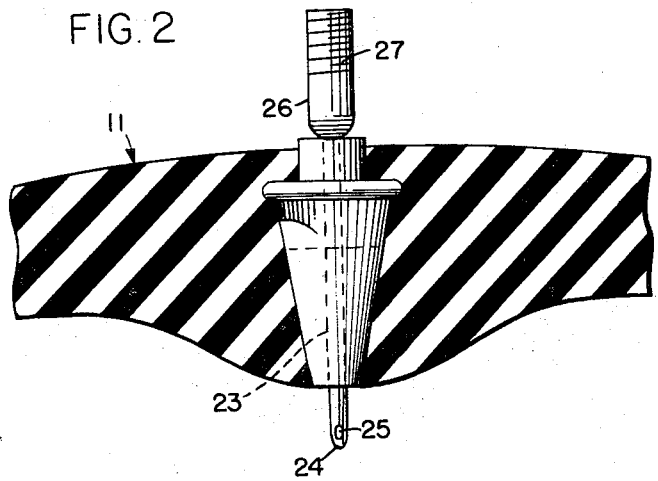
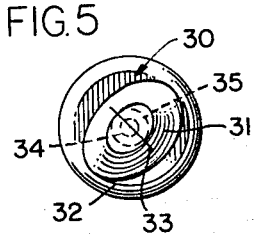
INVENTOR:
JAMES L. SCOTT
BY
Marzall, Johnston, Cook&Root
ATT'YS

United States Patent Office 3,401,714
Patented Sept. 17, 1968

3,401,714
VALVE STRUCTURES FOR INFLATABLE ARTICLES
James L. Scott, North Baltimore, Ohio, assignor to The D. S. Brown Company, North Baltimore, Ohio, a corporation of Ohio
Filed Aug. 26, 1965, Ser. No. 482,726
2 Claims. (Cl. 137—223)

ABSTRACT OF THE DISCLOSURE

Inflatable articles having apertured enlargement with tapered, slit, elastomer body valve tightly fitted therein.

---

This invention in general relates to valve structures for inflatable articles and more particularly pertains to elastomer valve structures and combinations thereof with inflatable, hollow, elastomer articles such as sporting and game balls.

The type of valve structures to which this invention pertains is a valve adapted to be penetrated by a needle valve for inflation of the hollow, elastomer article. When the needle valve is withdrawn, the valve automatically closes and seals the needle valve-penetrable opening against loss of air or other gas confined within the hollow, elastomer article. The valve structures of the invention have particular advantage when used in hollow, inflatable, elastomer articles made of polyurethane rubbers. in which rubbers the known valve structures for inflatable articles are difficult to use with success. The valve structures of the invention, however, are also useful in hollow, inflatable articles made from other elastomers.

Briefly, the valve structures of the invention comprise an elastomer body with a tapered, solid, elastomer segment. The elastomer segment is provided with a thin, normally closed slit extending across the smaller end of the tapered segment and axially toward the larger end thereof. The valve structure also has an elastomer head portion on the larger end and an axial needle valve aperture extending through the head portion and said larger end into communication with the slit. The needle valve is inserted into the outer end of the last-mentioned aperture and through the slit with its tip projecting beyond the end of the smaller end of the tapered segment. In this state the inflatable article can be inflated to the desired extent, after which the needle valve is withdrawn. When the needle valve is withdrawn from the slit, it closes and seals the valve against air loss.

When the hollow, inflatable, elastomer article is manufactured, it is provided with an aperture through the wall for sealing and holding the valve structure of the invention. The aperture has a cross section smaller than the cross section of the tapered segment so that, when the latter is pushed into said aperture, the wall of the aperture about the tapered segment is elastically, radially, outwardly distended. The so distended wall elastically urges closed the slit to seal the slit against air loss through the valve structure.

It is accordingly an object of this invention to provide new elastomer valve structures useful in inflatable, elastomer articles.

A further object of the invention is to provide elastomer valve structures embodying a tapered, preferably frusto-conical, solid, elastomer segment with a thin, normally closed, slit extending across the smaller end of the segment and axially toward the larger end thereof for the purposes heretofore described.

Still another object of the invention is to provide a combination of a valve structure as aforesaid and an inflatable, hollow, elastomer article wherein said valve structure is mounted in an aperture through the wall of said hollow article and the tapered segment is seated in said aperture with the wall thereof about the frusto-conical segment, being radially, downwardly, elastically distended, whereby said wall elastically urges closed said slit to seal the latter against air loss through the valve structure.

These, as well as other objects, purposes and advantages of the invention hereinafter described or made apparent to those skilled in the art may be achieved by the practice of the invention in accordance with the embodiments of the invention hereinafter described and shown in the drawings wherein:

FIGURE 1 is an exploded view of the valve structure in side elevation and a cross section of a fragment of the inflatable, hollow, elastomer article in the rear of the valve-receiving aperture therein;

FIG. 2 is a sectional view of a fragment of a hollow, elastomer, inflatable article similar to that of FIG. 1 with the valve structure of FIG. 1 mounted therein and with a needle valve penetrating said valve structure;

FIG. 3 is an end elevation of the valve structure of FIGS. 1 and 2;

FIG. 4 is a bottom plan view thereof; and

FIG. 5 is a bottom plan view of a modified form of said valve structure.

Referring to the drawings, there is shown in FIGS. 1–4 an elastomer valve body 10 and a fragment of an inflatable, hollow, elastomer article 11, such as a ball. The article 11 has a relatively thin, elastomer wall 12, e.g., a spherical wall. During the manufacture thereof by spin molding or the like, a plug is inserted in the mold or die for the purpose of forming an aperture to receive the valve. The elastomer about the plug forms a slightly enlarged or thicker segment 13 through which extends the aperture comprised of an inner, cylindrical segment 14, a ring-shaped enlargement 15 and an outer, cylindrical segment 16, all of which are concentric.

The elastomer valve plug 10 for insertion into said aperture comprises an inner frusto-conical, solid, elastomer segment 17. At the base or larger end of the segment 17 there is integrally formed a ring flange 18 of solid elastomer, the diameter of which flange is about the same as or slightly larger than the diameter of the ring-shaped enlargement 15. The flange 18 and a cylindrical, solid, elastomer outer segment 19 comprise the head portion of the valve.

The head portion of the valve and the base of the frusto-conical segment 17 have an axial aperture 20 extending between the outer face of segment 19 and the slit 21. The purpose for the axial aperture 20 is to accommodate the shank of an inflation needle.

The slit 21 is a thin, normally closed, diametric slit extending axially from the smaller end of the frusto-conical segment toward the larger end. The base 22 of the slit preferably is located a short distance from the base of the frusto-conical segment 17.

As shown in FIG. 2, the hollow shank 23 of a needle is pushed into aperture 20 until its tip 24 projects beyond the inner side of the plug valve 10, whereby the air discharge aperture 25 is inside the inflatable article 11. The outer end of the needle valve comprises a hollow cup member 26 having threads 27, the latter adapted to be threaded with a coupling on a tire pump, or the like.

After the inflatable article is inflated to the desired hardness, the shank 23 of the needle is withdrawn. The slit 21, under the elastic urging of the distended wall of aperture segment 14, closes tightly and prevents escape of air out the plug valve 10.

While the frusto-conical shape for the segment 17 is preferred, other tapered shapes may be used. FIG. 5 shows an alternate embodiment involving a solid, elastomer, tapered segment 31 of oval cross section. The slit 33, corresponding to slit 21 in FIGS. 1–4, is oriented along the minor axis of the oval in the case of FIG. 5. The remainder of the plug valve 30 of FIG. 5 corresponds substantially with the previously described plug valve 10, i.e., a solid, elastomer, ring-shaped flange 32, a solid, elastomer, conical segment 35 and an axial passage 34 therethrough, the latter corresponding to elements 18, 19 and 20 of FIGS. 1–4.

The plug valve of FIG. 5 may be inserted into a cylindrical aperture of the character shown in FIG. 1. The portions of the tapered ovalular segment 31 contiguous to the major axis of the oval distends the wall of cylindrical aperture segment 14 to a greater degree than the distention of said wall by the portions of segment 31 contiguous to the minor axis, whereby the elastomer recovery forces tending to press inwardly against tapered segment 31 are greatest at substantially right angles to the slit 33.

The slits 21 and 33 are slits cut in the segments 17 and 31, respectively, with a cutting instrument having a thin, sharp blade. The blade must be thin enough and sharp enough to avoid removal of any material during the cutting whereby the cut opposing faces of the slits match each other perfectly.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The combination of an inflatable, hollow, elastomer article having a thin elastomer wall with a thicker elastomer segment integrally formed on the inner surface thereof, said segment having a cylindrical aperture formed therein, and extending therethrough, an elastomer valve seated in said aperture, said valve having a frusto-conical, solid elastomer segment with a thin, normally closed, diametric slit extending completely across the smaller end of said frusto-conical segment and axially toward the larger end thereof, said smaller end having a diameter substantially equal to the diameter of said cylindrical aperture, a cylindrical elastomer head portion of smaller diameter than said larger end and projecting coaxially from said larger end with an axial, needle valve aperture extending through said head portion and said larger end into communication with said slit, the cylindrical wall of said cylindrical aperture surrounding the slitted portion of said frusto-conical segment and being radially outwardly distended into frusto-conical shape by said frusto-conical segment seated therein whereby said wall keeps said slit closed and thereby seals said slit against air loss through said valve structure, and the smaller end of the frusto-conical segment being substantially flush with the inner face of the thicker elastomer segment.

2. The combination as claimed in claim 1 wherein said wall of said cylindrical aperture has a ring-shaped recess therein adjacent to but inwardly from the outer end thereof, and an elastomer ring flange formed integrally on the base of said larger end and tightly seated in said recess.

References Cited

UNITED STATES PATENTS 2,317,545  4/1943  Madsen et al. ____ 137—525.1 X
2,830,610  4/1958  Chupa _____ 137—525.1 X

FOREIGN PATENTS 452,128  10/1949  Italy.

WILLIAM F. O'DEA, *Primary Examiner.*

D. LAMBERT, *Assistant Examiner.*